US009185277B2

(12) United States Patent
Lee et al.

(10) Patent No.: US 9,185,277 B2
(45) Date of Patent: Nov. 10, 2015

(54) PANEL CAMERA, AND OPTICAL TOUCH SCREEN AND DISPLAY APPARATUS EMPLOYING THE PANEL CAMERA

(75) Inventors: Hyoung-ki Lee, Seongnam-si (KR); Min-seog Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 460 days.

(21) Appl. No.: 13/244,318

(22) Filed: Sep. 24, 2011

(65) Prior Publication Data

US 2012/0169669 A1 Jul. 5, 2012

(30) Foreign Application Priority Data

Dec. 30, 2010 (KR) ........................ 10-2010-0139342

(51) Int. Cl.
G06F 3/042 (2006.01)
G06F 3/041 (2006.01)
H04N 5/225 (2006.01)

(52) U.S. Cl.
CPC .............. H04N 5/2254 (2013.01); G06F 3/042 (2013.01)

(58) Field of Classification Search
CPC ... G06F 3/0421; G06F 3/0425; G06F 3/0428; G06F 3/0412; G06F 3/03–3/0325; G06F 3/041–3/047; H04N 5/225–5/2259; H04N 7/144; G02F 2001/13312; G02F 2001/133607; G02K 9/0004; H01L 27/14627; H01L 27/14643
USPC ........................... 345/156–184; 348/335, 336
See application file for complete search history.

(56) References Cited

U.S. PATENT DOCUMENTS

| 7,362,320 | B2 | 4/2008 | Payne et al. |
| 7,557,338 | B2* | 7/2009 | Gruhlke et al. ............... 250/221 |
| 8,400,413 | B2* | 3/2013 | Otani et al. ................... 345/173 |
| 2004/0119104 | A1* | 6/2004 | Szajewski et al. ............ 257/291 |
| 2004/0208348 | A1* | 10/2004 | Baharav et al. ............... 382/124 |
| 2005/0128332 | A1* | 6/2005 | Tsuboi ...................... 348/333.12 |
| 2006/0055811 | A1* | 3/2006 | Frtiz et al. ..................... 348/340 |
| 2007/0109272 | A1* | 5/2007 | Orsley et al. .................. 345/173 |
| 2007/0285406 | A1* | 12/2007 | Kukulj et al. ................. 345/176 |
| 2008/0060854 | A1* | 3/2008 | Perlin ......................... 178/18.03 |
| 2008/0074401 | A1* | 3/2008 | Chung et al. .................. 345/175 |
| 2008/0106628 | A1* | 5/2008 | Cok et al. ................. 348/333.01 |
| 2008/0117183 | A1* | 5/2008 | Yu et al. ........................ 345/173 |
| 2008/0121442 | A1* | 5/2008 | Boer et al. ................. 178/18.09 |
| 2008/0129700 | A1* | 6/2008 | Morrison ...................... 345/173 |
| 2008/0273019 | A1* | 11/2008 | Deane ........................... 345/176 |
| 2009/0021488 | A1* | 1/2009 | Kali et al. ..................... 345/173 |

(Continued)

FOREIGN PATENT DOCUMENTS

| JP | 2007-86931 A | 4/2007 |
| JP | 2008-241807 A | 10/2008 |

(Continued)

*Primary Examiner* — Amr Awad
*Assistant Examiner* — Roberto Flores
(74) *Attorney, Agent, or Firm* — Sughrue Mion, PLLC

(57) ABSTRACT

A panel camera, and an optical touch screen and a display apparatus employing the panel camera. The panel camera includes a lens panel comprising a plurality of narrow-angle lenses arranged in a two-dimensional (2D) array and a light-detection panel comprising a plurality of light detectors which are arranged in a 2D array to respectively correspond to the plurality of narrow-angle lenses to receive lights passing through the plurality of narrow-angle lenses from outside and obtain a remote image.

8 Claims, 6 Drawing Sheets

(56) References Cited

U.S. PATENT DOCUMENTS

| | | | |
|---|---|---|---|
| 2009/0109178 A1* | 4/2009 | Kim et al. | 345/166 |
| 2009/0314929 A1* | 12/2009 | Lee et al. | 250/227.28 |
| 2009/0315993 A1* | 12/2009 | Hirai | 348/148 |
| 2010/0302196 A1* | 12/2010 | Han et al. | 345/173 |
| 2011/0037732 A1* | 2/2011 | Takama et al. | 345/175 |
| 2012/0001871 A1* | 1/2012 | Chang et al. | 345/175 |
| 2012/0026093 A1* | 2/2012 | Duparre et al. | 345/166 |

FOREIGN PATENT DOCUMENTS

| | | |
|---|---|---|
| JP | 2009-288956 A | 12/2009 |
| KR | 10-2009-0051587 A | 5/2009 |

\* cited by examiner

PANEL CAMERA, AND OPTICAL TOUCH SCREEN AND DISPLAY APPARATUS EMPLOYING THE PANEL CAMERA

CROSS-REFERENCE TO RELATED APPLICATIONS

This application claims priority from Korean Patent Application No. 10-2010-0139342, filed on Dec. 30, 2010, in the Korean Intellectual Property Office, the contents of which are hereby incorporated by incorporated by reference in their entirety.

BACKGROUND

1. Field

Apparatuses consistent with exemplary embodiments relate to panel cameras, and optical touch screens and display apparatuses employing the panel camera.

2. Description of the Related Art

A touch screen, which is a User Interface (UI), is installed on a front surface of a display of an electronic device such as a computer, a notebook, a Portable Media Player (PMP), etc., to input a particular command or data to the electronic device by sensing a touch point which a finger or a pointing device touches.

With the increasing demand for user convenience, the demand for such a touch screen is also increasing and the application range of the touch screen is expanding to broadcasting, education, medical imaging, pictures, music, moving pictures, virtual reality games, and e-commerce such as Business-to-Business (B2B) commerce or Business-to-Consumer (B2C) commerce.

In the touch screen, touch sensing through touches, such as in capacitive type sensing or resistive type sensing, has been widely used. For more convenient UIs, there is a need for proximity touch sensing for sensing motion of a finger in a non-contact manner and recognition of a user's action from a remote distance.

SUMMARY

One or more exemplary embodiments include a panel camera which is capable of proximity photographing and remote photographing to allow recognition of proximal actions and remote actions, and an optical touch screen and a display apparatus employing the panel camera.

Additional exemplary embodiments will be set forth in the description which follows, and will be apparent from the description, or may be learned by practice of the presented exemplary embodiments.

According to an exemplary embodiment, a camera includes a lens panel including a plurality of narrow-angle lenses arranged in a two-dimensional (2D) array and a light-detection panel including a plurality of light detectors which are arranged in a 2D array to respectively correspond to the plurality of narrow-angle lenses to receive lights passing through the plurality of narrow-angle lenses from outside and obtain a remote image.

According to exemplary embodiments, each of the narrow-angle lenses may include a micro lens including a conical transparent body portion and a light guide connected to the conical transparent body portion.

Also according to exemplary embodiments, each of the narrow-angle lenses may further include a cladding portion surrounding the conical transparent body portion of the micro lens and the light guide.

Further exemplary embodiments may include a color filter between the lens panel and the light-detection panel to sense a color image.

According to another exemplary embodiment, an optical touch screen includes a lens panel including a plurality of narrow-angle lenses and a wide-angle lens which are arranged in a two-dimensional (2D) array, an infrared light source disposed under the lens panel to emit infrared light, and a light-detection panel disposed between the lens panel and the infrared light source, such that a first light-detector and a second light-detector are arranged in a 2D array, the first light-detector receiving lights passing through the plurality of narrow-angle lenses from outside to obtain a remote image and the second light-detector detecting infrared light emitted from the infrared light source and detecting infrared light reflected by an object that touches or is proximate to the optical touch screen.

According to exemplary embodiment the lens panel may be provided such that the narrow-angle lens and the wide-angle lens are positioned for each pixel region, and the first light-detector and the second light-detector of the light-detection panel may be provided to respectively correspond to the narrow-angle lens and the wide-angle lens.

The optical touch screen of exemplary embodiments may further include a color filter including a plurality of color elements for each pixel region between the lens panel and the light-detection panel, in which the lens panel may include a plurality of narrow-angle lenses corresponding to the plurality of color elements and at least one wide-angle lens for each pixel region, and the light-detection panel may include a plurality of first light-detectors respectively corresponding to the plurality of narrow-angle lenses and at least one second light-detector for each pixel region to obtain color image.

According to another exemplary embodiment, a display apparatus includes a display panel modulating incident light to form an image and the aforementioned camera provided on the display panel to obtain an image in front of the display panel.

The panel camera of exemplary embodiments may further include a color filter between the lens panel and the light-detection panel to sense a color image.

According to another exemplary embodiment, a display apparatus includes a display panel modulating incident light to form an image, a lens panel provided on a front surface of the display panel such that a narrow-angle lens and a wide-angle lens which are arranged in a two-dimensional (2D) array, an infrared light source disposed under the lens panel to emit infrared light, and a light-detection panel disposed between the lens panel and the infrared light source, such that a first light-detector and a second light-detector are arranged in a 2D array, the first light-detector receiving lights passing through the plurality of narrow-angle lenses from outside to obtain a remote image and the second light-detector detecting infrared light emitted from the infrared light source and detecting infrared light reflected by an object that touches or is proximate to a display surface of the display apparatus.

The display apparatus of exemplary embodiments may further include a backlight unit provided to illuminate the display panel with white light, in which the infrared light source is provided in the backlight unit.

The display panel of exemplary embodiments may be a transmission color liquid crystal panel, and the display apparatus may further include an illumination light source illuminating the display panel with white light and a backlight unit in which the infrared light source is disposed.

The lens panel of exemplary embodiments may be provided such that the narrow-angle lens and the wide-angle lens are positioned for each pixel region, and the first light-detector and the second light-detector of the light-detection panel may be provided to respectively correspond to the narrow-angle lens and the wide-angle lens.

The display apparatus of exemplary embodiments may further include a color filter including a plurality of color elements for each pixel region between the lens panel and the light-detection panel, in which the lens panel may include a plurality of narrow-angle lenses corresponding to the plurality of color elements and at least one wide-angle lens for each pixel region, and the light-detection panel may include a plurality of first light-detectors respectively corresponding to the plurality of narrow-angle lenses and at least one second light-detector for each pixel region to obtain color image.

The optical touch screen of exemplary embodiments to which the panel camera is applied can perform both proximity photographing and remote photographing, and thus can be used as a motion UI through action recognition. The display apparatus to which the panel camera is applied can obtain an image in front of a panel, e.g., a liquid crystal panel, without a separate camera, thus allowing users to make conversation while seeing their frontal faces facing the display panel during video communication.

BRIEF DESCRIPTION OF THE DRAWINGS

These and/or other aspects of exemplary embodiments will become apparent and more readily appreciated from the following description of the exemplary embodiments, taken in conjunction with the accompanying drawings of which.

DETAILED DESCRIPTION

Figure 1:
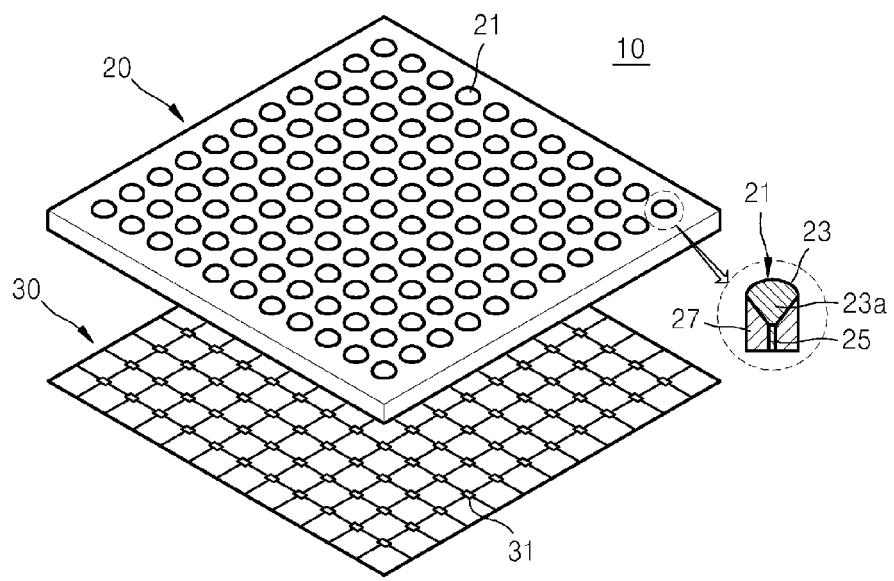
FIG. 1 is a perspective view schematically showing a panel camera according to an exemplary embodiment.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the exemplary embodiments.

Hereinafter, a panel camera (image obtaining apparatus) according to an exemplary embodiment, and an optical touch screen and a display apparatus employing the panel camera will be described with reference to the accompanying drawings. In the drawings, sizes, thicknesses, and intervals of components, etc., have been exaggerated for clarity.

FIG. 1 is a perspective view schematically showing a panel camera 10 according to an exemplary embodiment.

Referring to FIG. 1, the panel camera 10 may include a lens panel 20 and a light-detection panel 30. The lens panel 20 may include a plurality of narrow-angle lenses 21 arranged in a two-dimensional (2D) array. The light-detection panel 30 may include a plurality of light detectors 31 arranged in a 2D array to receive lights passing through the narrow-angle lenses 21 to obtain a remote image. The 2D array of the plurality of light detectors 31 may be provided to respectively correspond to the plurality of narrow-angle lenses 21 or may be provided such that one light detector 31 corresponds to two or more narrow-angle lenses 21.

The panel camera 10 may be structured such that the light detectors 31 are arranged at a large area in the array and the narrow-angle lenses 21 configured to control the direction of input of light are mounted on the array of the light detectors 31. The panel camera 10 may collect, for example, light incident in a particular direction, for example, directional light incident substantially perpendicular to the panel camera (i.e. light within a narrow angular range), and remove light incident outside the narrow angular range, thereby sequentially performing analog-to-digital (AD) conversion on the light incident from the array of the light detectors 31 and thus obtaining an image.

The narrow-angle lenses 21 each include a micro lens 23 having a conical transparent body portion 23a and a light guide 25 connected to the conical transparent body portion 23a. The conical transparent body portion 23a and the light guide 25 may be enclosed by a cladding portion 27. The cladding portion 27 may correspond to a body plate of the lens panel 20.

The narrow-angle lenses 21 each is a lens having a shape that is substantially the same as the ommatidium (compound eye) of a dragonfly. The dragonfly's ommatidium may collect, for example, light incident perpendicularly, and remove light incident at angles outside a narrow angular range. Light incident to the micro lens 23 having the conical transparent body portion 23a, after passing through the surface of the micro lens 23, is incident directly to the light guide 25 or is reflected by an inclined surface of the conical transparent body portion 23a and then is incident to the light guide 25. In this state, light incident at an angle satisfying total internal reflection conditions of the light guide 25 can be transmitted through the light guide 25 and then reach the corresponding light detector 31 of the light-detection panel 30.

Since only perpendicularly incident light or light incident within a narrow angular range, incident to the micro lenses 23 satisfies the total internal reflection conditions of the light guide 25, the narrow-angle lenses 21 cause only light incident perpendicularly to the micro lens 23 or light incident within a narrow angular range to be received by the corresponding light detector 31 of the light-detection panel 30.

Therefore, the panel camera 10, including the lens panel 20 having the 2D array of the narrow-angle lenses 21 and the light-detection panel 30 corresponding to the lens panel 20, can perform remote photographing as well as proximity photographing.

Hence, by using the panel camera 10, proximal and remote actions can be recognized.

Figure 2:
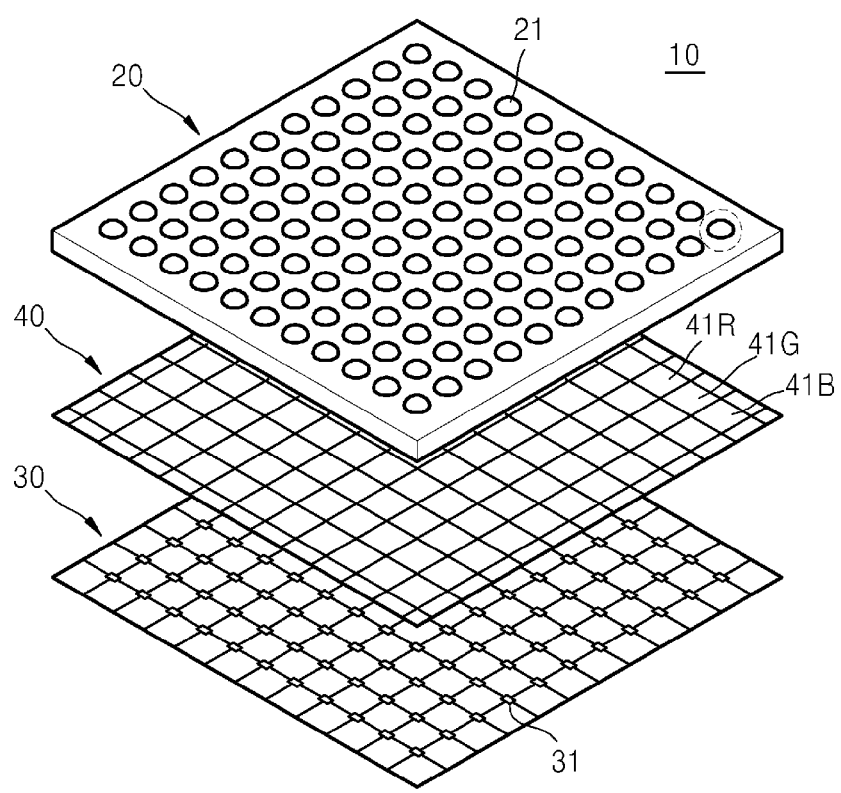
FIG. 2 is a perspective view schematically showing a panel camera according to another exemplary embodiment.

Moreover, by applying the panel camera 10 to an optical touch screen, the optical touch screen can perform proximity photographing or recognize remote actions; however, by applying the panel camera 10 to a display apparatus, the display apparatus can perform video communication. By configuring a display apparatus including an optical touch screen to which the panel camera 10 is applied, the display apparatus can perform proximity touch sensing for sensing motion of a finger in a non-contact manner, proximity photographing, recognition of a user's action from a remote distance, and video communication. FIG. 2 is a perspective view schematically showing a panel camera according to another embodiment of the present disclosure. The panel camera 10 may further include a color filter 40 between the lens panel 20 and the light-detection panel 30. The color filter 40 may include a red (R) color element 41R, a green (G) color element 41G, and a blue (B) color element 41B for each pixel. When the color filter 40 is provided, for example, three narrow-angle lenses 21 and three light detectors 31 may be arranged to correspond to the R, G, and B color elements 41R, 41G, and 41B for each pixel, respectively. A color image can be obtained using the color filter 40, and thus when the panel camera 10 is applied to a display apparatus, the display apparatus can perform color video communication.

Hereinafter, a description will be made of an exemplary embodiment of an optical touch screen to which the panel camera 10 is applied and a display apparatus to which the panel camera 10 and/or the optical touch screen is applied.

Figure 3:
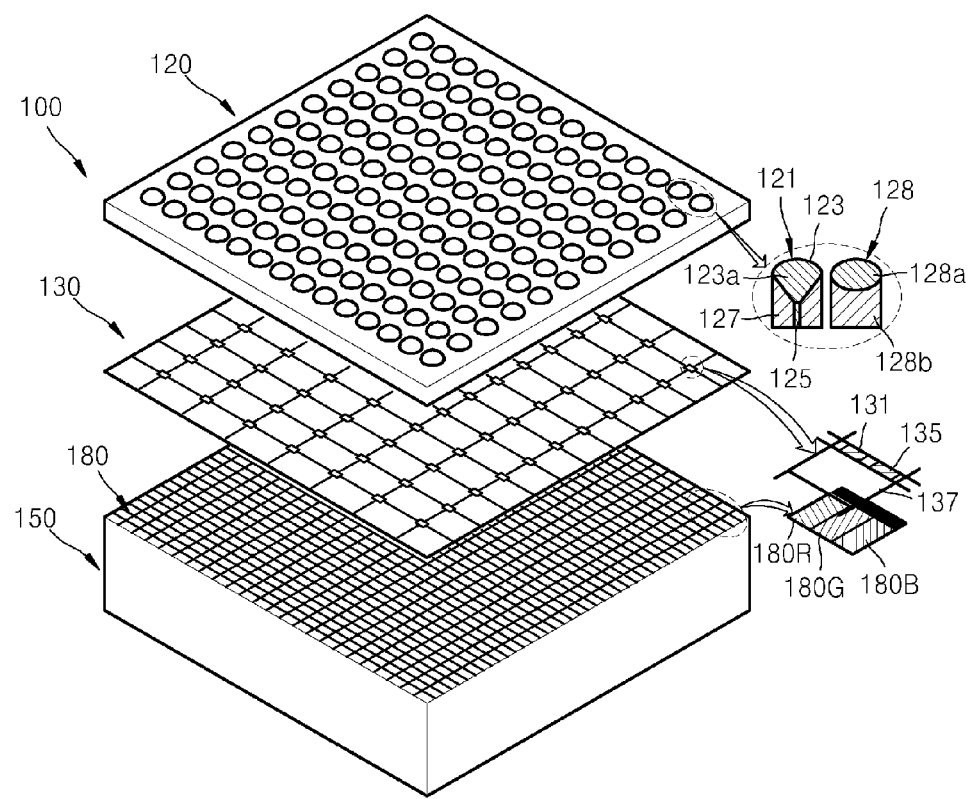
FIG. 3 is a perspective view schematically showing an optical touch screen to which a panel camera according to an exemplary embodiment is applied and a display apparatus of an exemplary embodiment including the optical touch screen.
Figure 4:
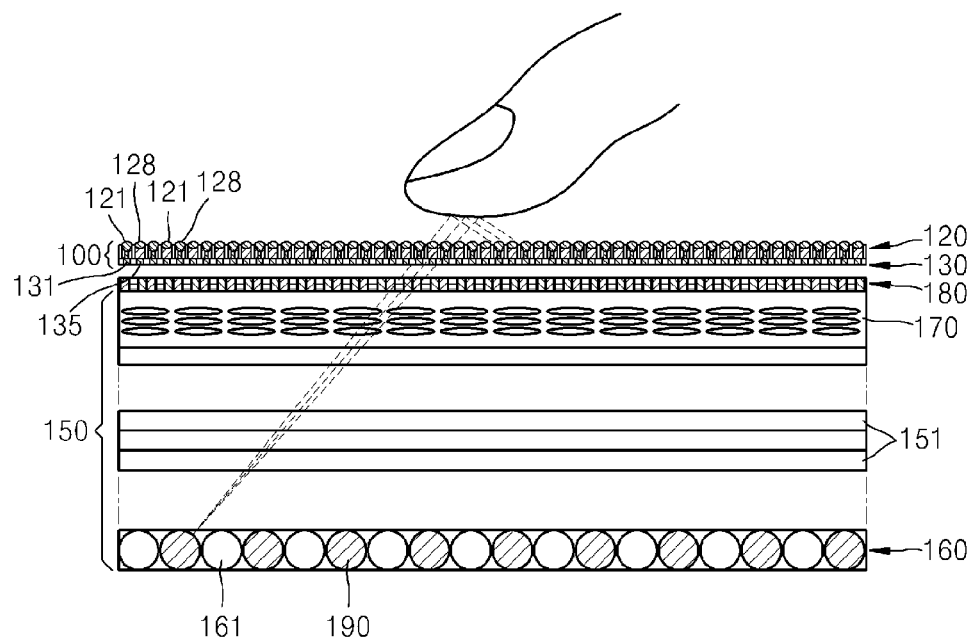
FIG. 4 is a schematic cross-sectional view of FIG. 3.

FIG. 3 is a perspective view schematically showing an exemplary embodiment of an optical touch screen 100 to which a panel camera is applied and a display apparatus including the optical touch screen. FIG. 4 is a schematic cross-sectional view of FIG. 3. Although the exemplary embodiment depicted in FIGS. 3 and 4 is directed to a display apparatus which includes an optical touch screen, as does the exemplary embodiment depicted in FIGS. 5 and 6, display apparatuses that do not include an optical touch screen are also included in exemplary embodiments. In addition, although the exemplary embodiment depicted in FIGS. 3 and 4 is directed to a display apparatus which includes a display panel, as does the exemplary embodiment depicted in FIGS. 5 and 6, exemplary embodiments also include display apparatuses which include optical touch screens instead of display panels. The structure and function of the optical touch screen itself can be sufficiently understood from a description of the display apparatus including the optical touch screen. Therefore, a separate illustration and repetitive description are omitted.

Referring to FIGS. 3 and 4, a display apparatus may include a display panel 150 which forms an image by modulating incident light, a lens panel 120 which is provided on a front surface of the display panel 150 and includes a 2D array of narrow-angle lenses 121 and wide-angle lenses 128, an infrared light source 190 that emits infrared light under the lens panel 120, and a light-detection panel 130 positioned between the lens panel 120 and the infrared light source 190. The lens panel 120, the infrared light source 190, and the light-detection panel 130 may be components of the optical touch screen 100. That is, the display apparatus may include the display panel 150 and the optical touch screen 100. The display apparatus may include a transmission liquid crystal panel, e.g., a transmission color liquid crystal panel, as the display panel 150, and may further include a backlight unit 160 including an illumination light source 161 to illuminate the display panel 150 with white light. The transmission color liquid crystal panel may include a liquid crystal layer 170 and a color filter layer 180. The infrared light source 190 may be disposed in the backlight unit 160 as shown in FIG. 4. The infrared light source 190 may be disposed under the lens panel 120 in another position other than in the backlight unit 160. In FIG. 4, reference numeral 151 indicates optical films which cause light emitted from the illumination light source 161 to be homogenized and to be incident to the liquid crystal layer 170.

To implement the optical touch screen 100, as well as image capturing, the lens panel 120 may be provided with wide-angle lenses 128 as well as narrow-angle lenses 121. The narrow-angle lenses 121 and the wide-angle lenses 128 are arranged in a 2D array of the lens panel 120. To correspond to this 2D array, the light-detection panel 130 is provided with a 2D array of light detectors 131 which receive lights passing through the narrow-angle lenses 121 to obtain a remote image. The light-detection panel 130 may also include light detectors 135 which detect infrared light emitted from the infrared light source 190 and reflected by an object (for example, a finger) that touches or is proximate to a surface of the optical touch screen 100, that is, a display surface of the display apparatus, thereby sensing a touch.

For example, the lens panel 120 and the light-detection panel 130 may be provided such that one light detector 131 corresponds to one narrow-angle lens 121 or two or more narrow-angle lenses 121 and one light detector 135 corresponds to one wide-angle lens 128 or two or more wide-angle lenses 128. FIGS. 3 and 4 illustrate an exemplary embodiment in which one light detector 131 is arranged to correspond to one narrow-angle lens 121, and one light detector 135 is arranged to correspond to one wide-angle lens 128. In this case, the light-detection panel 130 may be formed such that, as shown in the enlargement of FIG. 3, the light detectors 131 and 135 for a pixel are disposed at a side of the pixel, i.e., a black matrix portion of the pixel, and the other portion, that is, a portion corresponding to a color element region of the pixel, may be formed as a transparent region 137 whereby a path of lights emitted from R, G, and B color elements 180R, 180G, and 180B forming a pixel of the display panel 150 is not interfered, and thus an image formed in the display panel 150 is displayed with a maximum brightness. Moreover, the lens panel 120 is provided such that the wide-angle lens 128 is positioned directly on the light detector 135 for detecting infrared light and the narrow-angle lens 121 is positioned directly on the light detector 131 for detecting visible light. In other words, as shown in FIG. 3, lines of the narrow-angle lenses 121 and lines of the wide-angle lenses 128, which are arranged alternately, may be disposed at intervals corresponding to pixel widths and the remaining portion of the lens panel 120 may be formed as a planar transparent region. Thus, without interfering with a path of light expressing an image formed in the display panel 150, the light detectors 135 and the wide-angle lens 128 can detect infrared light reflected from an object, e.g., a finger. Furthermore, the light detectors 131 and the narrow-angle lens 121 can detect light incident substantially perpendicular and capture an image.

Also, like in the panel camera 10 described with reference to FIGS. 1 and 2, each narrow-angle lens 121 includes micro lens 123 having a conical transparent body portion 123a to only collect light incident that is substantially perpendicular, that is, light incident perpendicularly or light incident within a narrow angular range, and remove light incident at angles outside the narrow angular range, and the light guide 125 connected to the conical transparent body portion 123a. The conical transparent body portion 123a and the light guide 125 may be surrounded by a cladding portion 127.

Each of the narrow-angle lenses 121 is a lens having a shape that is substantially the same as the ommatidium of a dragonfly. Light incident to the micro lens 123 having the conical transparent body portion 123a, after passing through the surface of the micro lens 123, is reflected by an inclined surface of the conical transparent body portion 123a and then is incident to the light guide 125. In this state, light incident at an angle satisfying total internal reflection conditions of the light guide 125 can be transmitted through the light guide 125 and then reach the light detector 131 of the light-detection panel 130.

Since only perpendicularly incident light or light incident within a narrow angular range on the micro lenses 123 satisfies the total internal reflection conditions of the light guide 125, the narrow-angle lenses 121 cause only perpendicularly incident light or light incident within a narrow angular range will be received by the corresponding light detector 131 of the light-detection panel 130.

Therefore, the narrow-angle lenses 121 and the corresponding light detectors 131 allow remote photographing as well as proximity photographing, and the optical touch screen 100 and the display apparatus including the optical touch screen 100 can perform recognition of proximal and remote actions.

General micro lenses 128a are sufficient for the wide-angle lenses 128 provided on the lens panel 120, and curved surfaces may be formed on only outwardly exposed surfaces of the wide-angle lenses 128. For example, only an outwardly exposed surface of the wide-angle lens 128 may be formed as a curved surface of the micro lens 128a, and a body portion 128b may be formed of a transparent material. Each of the wide-angle lenses 128 may include the micro lens 128a of a biconvex type lens and the transparent body portion 128b on which the micro lens 128a sits. The transparent body portion 128b of the wide-angle lens 128 may be formed of the same material as the cladding portion 127 of the narrow-angle lens 121. For example, the cladding portion 127 of the narrow-angle lens 121 and the transparent body portion 128b of the wide-angle lens 128 may correspond to the body plate of the lens panel 120.

The wide-angle lens 128 collects infrared light emitted from the infrared light source 190 and reflected by an object that touches or is proximate to the surface of the optical touch screen 100 to allow the light detector 135 to receive the infrared light.

With the structure of the light detector 135 corresponding to the wide-angle lens 128, the optical touch screen 100 can input information by the detection of infrared light reflected by an object.

To implement the display apparatus, the lens panel 120 is structured such that each narrow-angle lens 121 and each wide-angle lens 128 are positioned for each pixel region and the light detectors 131 and 135 of the light-detection panel 130 may be provided to correspond to the narrow-angle lens 121 and the wide-angle lens 128, respectively.

FIGS. 3 and 4 show an exemplary embodiment in which, in each pixel, one narrow-angle lens 121 and one wide-angle lens 128 are positioned in pairs and the light detectors 131 and 135 are positioned in pairs to respectively correspond to the lenses 121 and 128.

The above-described display apparatus may form an image on the display panel 150. With the infrared light source 190, the wide-angle lenses 128, and the light detectors 135, information can be input by detecting infrared light reflected by an object that touches or is proximate to the surface of the display apparatus. Moreover, with the narrow-angle lenses 121 and the light detectors 131, proximity or remote images can be obtained without needing a separately mounted camera.

Figure 5:
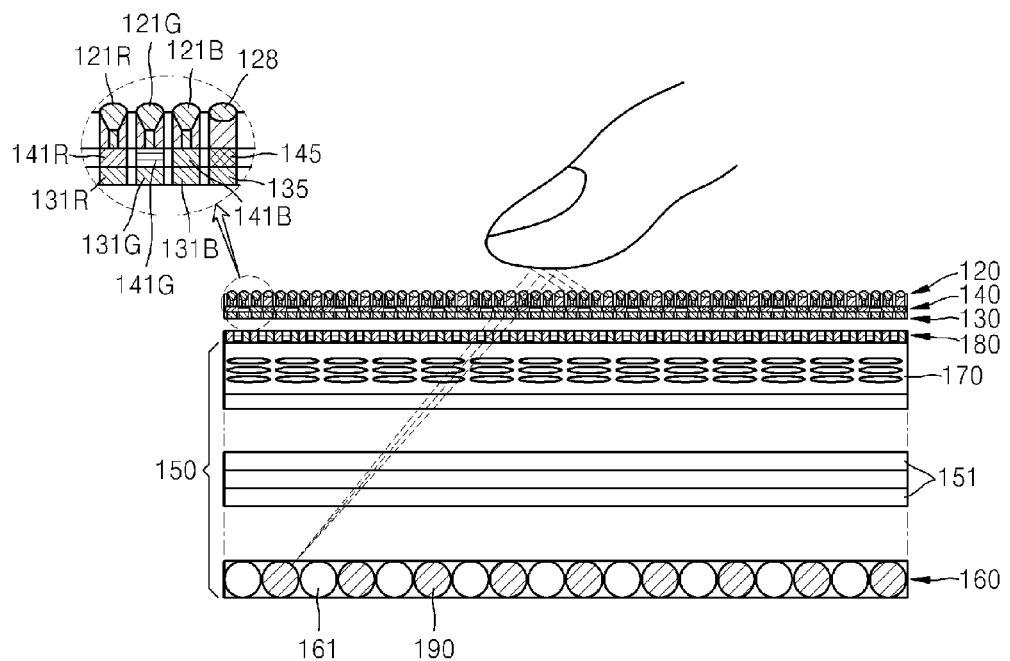
FIG. 5 is a perspective view schematically showing an optical touch screen to which a camera capable of obtaining color images according to an exemplary embodiment is applied and a display apparatus of an exemplary embodiment including the optical touch screen.
Figure 6:
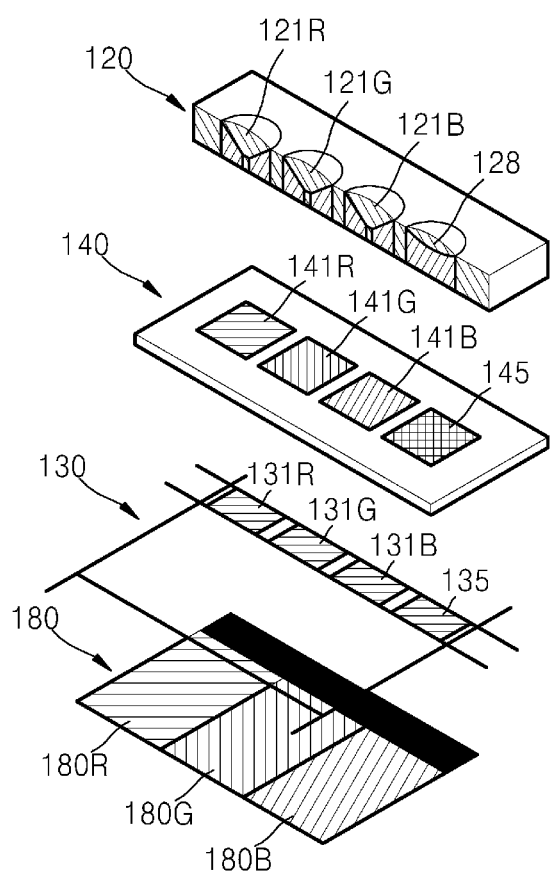
FIG. 6 schematically shows a structure of a pixel shown in FIG. 5.

Also, the display apparatus may also be provided to obtain a color image in proximity to or a remote distance from the display apparatus, as shown in FIGS. 5 and 6.

FIG. 5 is a perspective view schematically showing an optical touch screen to which a camera capable of obtaining color images according to an embodiment of the present disclosure is applied and a display apparatus including the optical touch screen. FIG. 6 schematically shows a structure of a pixel shown in FIG. 5. Although the exemplary embodiment depicted in FIGS. 5 and 6 includes an optical touch screen, exemplary embodiments may include display apparatuses without the optical touch screen. Herein, components which are the same as those in FIGS. 3 and 4 will be indicated by the same reference numerals as used in FIGS. 3 and 4 and repetitive description thereof will not be provided.

Referring to FIGS. 5 and 6, in comparison to the display apparatus of FIGS. 3 and 4, the display apparatus may further include a color filter 140 having a plurality of color elements 141R, 141G, 141B, and 145 for each pixel region between the lens panel 120 and the light-detection panel 130, so as to obtain a color image. To obtain a color image, the lens panel 120 may include a plurality of narrow-angle lenses 121R, 121G, and 121B and at least one wide-angle lens 128 corresponding to the plurality of R, G, and B color elements 141R, 141G, 141B, and 145 for each pixel region, and the light-detection panel 130 may include a plurality of light detectors 131R, 131G, and 131B respectively corresponding to the plurality of narrow-angle lenses 121R, 121G, and 121B, and at least one light detector 135 for each pixel region. In FIGS. 5 and 6, as an example, it is shown that the R, G, and B color elements 141R, 141G, and 141B and the infrared color element 145 for passing therethrough infrared light are provided in the color filter 140; in the lens panel 120, three narrow-angle lenses 121R, 121G, and 121B and one wide-angle lens 128 are provided for each pixel region to correspond respectively to the color elements 141R, 141G, 141B, and 145; and in the light-detection panel 130, three light detectors 131R, 131G, and 131B for obtaining a color image and one light detector 135 for detecting infrared light reflected by an object which touches or is proximate to a display surface of the display apparatus are provided for each pixel region.

The light-detection panel 130, as shown in FIG. 6, may be structured such that for a pixel of the display panel 150, the light detectors 131R, 131G, 131B, and 135 are arranged at a side of the pixel, that is, a black matrix portion of the pixel, and the other portion, that is, a portion corresponding to a color element region of the pixel may be formed as the transparent region 137, whereby a path of lights emitted from color elements 180R, 180G, and 180B forming the pixel is not interfered and thus an image formed in the display panel 150 is displayed with a maximum brightness. The color filter 140 may be formed such that the color elements 141R, 141G, 141B, and 145 are positioned only on a region where the light detectors 131R, 131G, 131B, and 135 are positioned, and the remaining region is formed to be transparent. Herein, a length of the color elements 141R, 141G, 141B, and 145 of the color filter 140 may be equal to a length of a pixel region. The lens panel 120 may be provided such that the wide-angle lens 128 is positioned only on the light detector 135 for detecting infrared light and the narrow-angle lenses 121R, 121G, and 121B are positioned only on the light detectors 131R, 131G, and 131B for detecting visible light. In other words, as in the previous embodiment described with reference to FIG. 3, lines of the narrow-angle lenses 121R, 121G, and 121B and lines of the wide-angle lenses 128, which are arranged alternately, are disposed at intervals corresponding to pixel widths, and the remaining portion of the lens panel 120 may be formed to be a planar transparent region. Thus, without interfering with a path of light expressing an image formed on the display panel 150, the light detectors 135, the infrared color elements 145, and the wide-angle lenses 128 can detect infrared light reflected by an object that touches a panel, for example, a finger, and sense a touch, and the light detectors 131R, 131G, and 131B, the R, G, and B color elements 141R, 141G, and 141B, and the narrow-angle lenses 121R, 121G, and 121B may detect light incident substantially perpendicular and capture a color image.

When the color filter 140 is provided between the lens panel 120 and the light-detection panel 130 and the lens panel 120 and the light-detection panel 130 are structured to correspond to the color filter 140, as shown in FIGS. 5 and 6, a proximity or remote image can be obtained as a color image, thus implementing a display apparatus having a color camera function.

Although the exemplary embodiment described above includes an optical touch screen, the display apparatus according to other exemplary embodiments may have a structure without the optical touch screen. In other words, by changing the structure shown in FIGS. 3 through 6 into a structure where the infrared light source 190, the wide-angle lenses 128, and the light detectors 135 are omitted, the display apparatus to which the panel camera is applied can be implemented without the optical touch screen.

As can be appreciated from the foregoing description, the optical touch screen to which the panel camera is applied can perform both proximity photographing and remote photographing, and thus, can be used as a motion UI through action recognition. Moreover, proximity touch sensing within several centimeters in a non-contact manner is also possible, allowing designing of various UIs. The display apparatus to which the panel camera is applied can obtain an image in front of a panel, e.g., a liquid crystal panel, without a separate camera, thus allowing users to converse while seeing the front of their faces facing the display panel during video communication.

While the exemplary embodiments have been shown and described, it will be understood by those skilled in the art that various changes in form and details may be made thereto without departing from the spirit and scope of the inventive concept as defined by the appended claims.

In addition, many modifications can be made to adapt a particular situation or material to the teachings of this disclosure without departing from the essential scope thereof. Therefore, it is intended that the inventive concept not be limited to the particular exemplary embodiments disclosed, but that the inventive concept will include all embodiments falling within the scope of the appended claims.

What is claimed is:

1. An optical touch screen comprising:
a lens panel comprising a plurality of narrow-angle lenses and a plurality of wide-angle lenses, the plurality of narrow angle lenses and the plurality of wide angle lenses being arranged in a two-dimensional (2D) array;
an infrared light source disposed under the lens panel; and
a light-detection panel disposed between the lens panel and the infrared light source, comprising a plurality of first light-detectors and a plurality of second light-detectors, the plurality of first light detectors and the plurality of second light detectors being arranged in a 2D array,
wherein one of the plurality of first light-detectors receives light passing through one of the plurality of narrow-angle lenses from outside, and
wherein one of the second plurality of light-detectors detects infrared light emitted from the infrared light source and detects infrared light reflected by an object that is in contact with or is proximate to the optical touch screen,
wherein the one of the plurality of narrow-angle lenses comprises:
a micro lens comprising a conical transparent body portion; and
a light guide connected to the conical transparent body portion,
wherein the one of the plurality of narrow-angle lenses and one of the plurality of wide-angle lenses is positioned in one of a plurality of pixel regions,
wherein the one of the plurality of first light-detectors corresponds to the one of the plurality of narrow-angle lenses,
wherein the one of the plurality of second light-detectors corresponds to the one of the plurality of the wide-angle lenses, and
wherein each of the plurality of pixel regions is provided with a respective one of the plurality of narrow-angle lenses and a respective one of the plurality of wide-angle lenses such that the plurality of narrow-angle lenses are arranged alternately with respect to the plurality of wide-angle lenses.

2. The optical touch screen of claim 1, wherein the one of the plurality of narrow-angle lenses further comprises a cladding portion surrounding the conical transparent body portion and the light guide.

3. The optical touch screen of claim 1, further comprising a color filter comprising a plurality of color elements for one of a plurality of pixel regions, the plurality of color elements being disposed between the lens panel and the light-detection panel,
wherein the one pixel region comprises at least two of the plurality of narrow-angle lenses corresponding to the plurality of color elements and at least one of the plurality of wide-angle lenses, and
wherein the one pixel region further comprises at least two of the plurality of first light-detectors corresponding to the at least two of the plurality of narrow-angle lenses and at least one of the plurality of second light-detectors.

4. A display apparatus comprising:
a display panel;
a lens panel disposed on a front surface of the display panel, comprising a plurality of narrow-angle lenses and a plurality of wide-angle lenses, the plurality of narrow angle lenses and the plurality of wide angle lenses being arranged in a two-dimensional (2D) array;
an infrared light source disposed under the lens panel; and
a light-detection panel disposed between the lens panel and the infrared light source, comprising a plurality of first light-detectors and a plurality of second light-detectors, the plurality of first light detectors and the plurality of second light detectors being arranged in a 2D array,
wherein the first light-detector receives light passing through the plurality of narrow-angle lenses, and
wherein the plurality of second light-detectors detects infrared light emitted from the infrared light source and detects infrared light reflected by an object that is in contact with or is proximate to a display surface of the display apparatus,
wherein one of the plurality of narrow-angle lenses comprises:
a micro lens comprising a conical transparent body portion; and
a light guide connected to the conical transparent body portion,
wherein at least two of the plurality of narrow-angle lenses and at least one of plurality of wide-angle lenses are positioned in a pixel region from among a plurality of pixel regions,
wherein at least two of the plurality of first light-detectors correspond to at least two of the plurality of narrow angle lenses, and at least one of the plurality of second light-detectors corresponds to at least one of the plurality of wide-angle lens, respectively, and wherein each of the plurality of pixel regions is provided with at least a respective one of the plurality of narrow-angle lenses and at least a respective one of the plurality of wide-angle lenses such that the plurality of narrow-angle lenses are arranged alternately with respect to the plurality of wide-angle lenses.

5. The display apparatus of claim 4, further comprising a backlight unit provided to illuminate the display panel with white light,
   wherein the infrared light source is provided in the backlight unit.

6. The display apparatus of claim 4, further comprises a backlight unit comprising an illumination light source illuminating the display panel;
   wherein the panel with white light, and the infrared light source are disposed in the backlight unit, and
   wherein the display panel is a transmission color liquid crystal panel.

7. The display apparatus of claim 4, wherein the one of the plurality of narrow-angle lenses further comprises a cladding portion surrounding the conical transparent body portion of the micro lens and the light guide.

8. A display apparatus comprising:
   a display panel;
   a lens panel disposed on a front surface of the display panel, comprising a plurality of narrow-angle lenses and a plurality of wide-angle lenses, the plurality of narrow angle lenses and the plurality of wide angle lenses being arranged in a two-dimensional (2D) array;
   an infrared light source disposed under the lens panel; and
   a light-detection panel disposed between the lens panel and the infrared light source, comprising a plurality of first light-detectors and a plurality of second light-detectors, the plurality of first light detectors and the plurality of second light detectors being arranged in a 2D array,
   wherein the first light-detector receives light passing through the plurality of narrow-angle lenses, and
   wherein the plurality of second light-detectors detects infrared light emitted from the infrared light source and detects infrared light reflected by an object that is in contact with or is proximate to a display surface of the display apparatus,
   wherein one of the plurality of narrow-angle lenses comprises:
   a micro lens comprising a conical transparent body portion; and
   a light guide connected to the conical transparent body portion,
   wherein at least two of the plurality of narrow-angle lenses and at least one of plurality of wide-angle lenses are positioned in a first pixel region from among a plurality of pixel regions, and
   wherein at least two of the plurality of first light-detectors correspond to at least two of the plurality of narrow angle lenses, and at least one of the plurality of second light-detectors corresponds to at least one of the plurality of wide-angle lens, respectively,
   and the display apparatus further comprising a color filter comprising a plurality of color elements disposed between the lens panel and the light-detection panel,
   wherein the first pixel region comprises at least two of the plurality of narrow-angle lenses corresponding to at least two of the plurality of color elements and at least one of the plurality of wide-angle lenses, and
   wherein the first pixel region further comprises at least two of the plurality of first light-detectors corresponding to the at least two of the plurality of narrow-angle lenses and at least one of the plurality of second light-detectors, and
   wherein each of the plurality of pixel regions is provided with at least a respective one of the plurality of narrow-angle lenses and at least a respective one of the plurality of wide-angle lenses such that the plurality of narrow-angle lenses are arranged alternately with respect to the plurality of wide-angle lenses.

* * * * *